United States Patent
Tart et al.

(10) Patent No.: US 9,342,485 B2
(45) Date of Patent: May 17, 2016

(54) METHODS AND SYSTEMS FOR CONDITIONING SIGNALS FROM A SPEED SENSOR

(71) Applicant: General Electric Company, Schenectady, NY (US)

(72) Inventors: Michael Alan Tart, Gardnerville, NV (US); Michael Dean Evans, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 13/755,817

(22) Filed: Jan. 31, 2013

(65) Prior Publication Data

US 2014/0214352 A1 Jul. 31, 2014

(51) Int. Cl.
| | |
|---|---|
| *G01P 1/00* | (2006.01) |
| *G01P 21/02* | (2006.01) |
| *G06F 17/00* | (2006.01) |
| *G01P 3/481* | (2006.01) |
| *G01P 3/489* | (2006.01) |

(52) U.S. Cl.
CPC ............... *G06F 17/00* (2013.01); *G01P 3/481* (2013.01); *G01P 3/489* (2013.01)

(58) Field of Classification Search
CPC ......... G06F 17/00; G01P 3/481; G01P 3/489; G01P 3/48; G01P 3/42; G01P 3/44; G01P 3/4802; G01P 3/4807; G01P 3/487; G01P 3/60; G01D 5/145; H03K 5/086
See application file for complete search history.

(56) References Cited

U.S. PATENT DOCUMENTS

| | | | | |
|---|---|---|---|---|
| 3,792,460 | A | * | 2/1974 | Ratz ........................ G01P 3/60 324/161 |
| 4,086,532 | A | | 4/1978 | Aronson et al. |
| 4,839,834 | A | * | 6/1989 | Omae .................. G01P 13/045 324/166 |
| 5,083,109 | A | | 1/1992 | McElroy et al. |
| 5,103,213 | A | | 4/1992 | Marsh et al. |
| 5,477,142 | A | | 12/1995 | Good et al. |
| 5,554,948 | A | * | 9/1996 | Hansen .................. H03K 5/086 324/166 |
| 5,706,199 | A | * | 1/1998 | Wilson ................... B60K 31/00 180/173 |
| 5,736,852 | A | | 4/1998 | Pattantyus |
| 6,442,502 | B1 | | 8/2002 | Lohberg et al. |
| 6,456,063 | B1 | * | 9/2002 | Moreno ................. G01D 3/021 324/167 |
| 6,664,841 | B1 | | 12/2003 | Cetin et al. |
| 7,554,079 | B2 | | 6/2009 | Rai et al. |
| 2004/0172208 | A1 | | 9/2004 | Freitag et al. |

OTHER PUBLICATIONS

Partial International Search from PCT/US2014/011902 dated Apr. 25, 2014.

* cited by examiner

*Primary Examiner* — Manuel L Barbee
(74) *Attorney, Agent, or Firm* — Fletcher Yoder, P.C.

(57) ABSTRACT

A circuit for use in conditioning a signal from a speed sensor. The circuit is configured to receive an analog signal from a speed sensor coupled to the circuit, acquire a threshold of the analog signal, generate a digital signal corresponding to the analog signal, based on the threshold, and output the digital signal.

20 Claims, 5 Drawing Sheets

METHODS AND SYSTEMS FOR CONDITIONING SIGNALS FROM A SPEED SENSOR

BACKGROUND OF THE INVENTION

The field of the invention relates generally to conditioning sensor information, and more particularly to systems and methods for use in conditioning a signal from a speed sensor.

In a machine with at least one rotating device, such as a rotating shaft, it may be beneficial to include a speed sensor in the machine to obtain a reference mark and timing information. A speed sensor provides phase, speed of rotation, and/or rotational position information. Such information may be used to determine whether the machine, and in particular, the rotating device, is operating normally.

Known speed sensors, to do this, are mounted at a fixed location near the rotating device. The rotating device includes a marker affixed at a given location along a circumference of the rotating device. As the marker rotates past the speed sensor, the speed sensor outputs a corresponding signal indicating that the marker has passed the speed sensor. In some implementations, multiple markers are placed at different locations along the circumference of the rotating device, and the speed sensor outputs a signal indicating that multiple markers passed the speed sensor every revolution. A known marker may be, for example, a notch or projection in the material of the rotating device. The speed sensor includes a transducer that outputs a signal that is representative of the nearness of the marker to the speed sensor. The signal is output as an analog signal and often includes noise due to vibration of the rotating device, electrical noise, and noise due to non-homogenous properties of the material of the rotating device. Accordingly, additional analog and digital circuitry is often coupled to the speed sensor to eliminate the noise and vibration and to convert the analog signal into a digital signal. However, such analog and digital circuitry generally includes multiple discrete components that increases the costs and complexity, and that increases the amount of space necessary to monitor the machine.

BRIEF DESCRIPTION OF THE INVENTION

In one aspect, a circuit for use in conditioning a signal from a speed sensor is provided. The circuit is configured to receive an analog signal from a speed sensor coupled to the circuit, acquire a threshold of the analog signal, generate a digital signal corresponding to the analog signal, based on the threshold, and output the digital signal.

In another aspect, a system for use in conditioning a signal from a speed sensor is provided. The system includes a device rotatably mounted in a machine, a speed sensor mounted proximal to the device, a circuit coupled to the speed sensor, and a computing device coupled to the circuit. The circuit is configured to receive an analog signal from the speed sensor, acquire a threshold of the analog signal, generate a digital signal corresponding to the analog signal, based on the threshold, and output the digital signal to the computing device.

In another aspect, a method for use in conditioning a signal from a speed sensor is provided. The method includes receiving, at a circuit, an analog signal from a speed sensor communicatively coupled to the circuit. The method further includes acquiring, at the circuit, a threshold of the analog signal. Additionally, the method includes generating, at the circuit, a digital signal corresponding to the analog signal, based on the threshold and outputting the digital signal from the circuit.

DETAILED DESCRIPTION OF THE INVENTION

Figure 1:
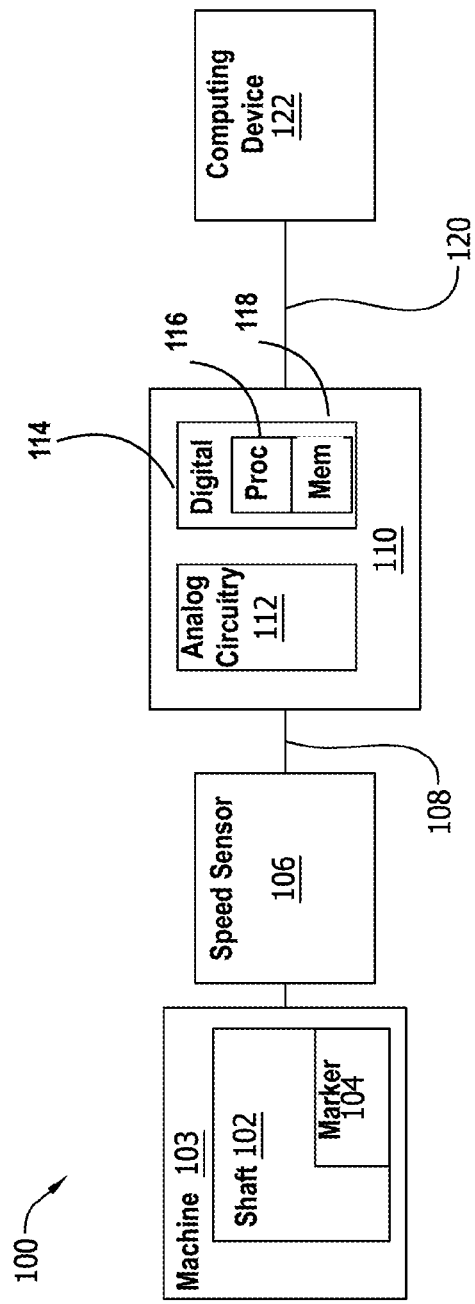
FIG. 1 is a block diagram of an exemplary system that may be used to condition a signal from a speed sensor.

FIG. 1 is a block diagram of an exemplary system 100 that may be used to condition a signal from a speed sensor 106. In the exemplary embodiment, speed sensor 106 is mounted proximal to shaft 102. Shaft 102 is rotatably mounted to, or coupled within, a machine 103. In other embodiments, shaft 102 may instead be any other rotatably mounted device. Shaft 102 includes a marker 104 that speed sensor 106 is capable of sensing when marker 104 is within a predetermined proximity of speed sensor 106. Marker 104 may be, for example, a notch or projection in the material of shaft 102 or a magnetic component coupled to or incorporated in, shaft 102. As shaft 102 rotates, marker 104 rotates past speed sensor 106. Each occurrence of marker 104 rotating past speed sensor 106 is reflected in an analog signal, such as, for example, analog signal 402 (FIG. 4), that is output by speed sensor 106. For example, speed sensor 106 may output an analog signal of 2v (volts) when marker 104 is not within a predetermined proximity of speed sensor 106, and as marker 104 rotates into the predetermined proximity, analog signal 402 (FIG. 4) transitions to 18v. As marker 104 rotates out of the predetermined proximity of speed sensor 106, the analog signal transitions back to 2v. Accordingly, while the predetermined proximity may depend on the particular speed sensor 106 employed, the rotation is such that marker 104 comes within the predetermined proximity once per rotation of shaft 102. In other embodiments, the analog signal may have the opposite polarity and may have a different voltage range. Due to vibration and/or other effects induced to shaft 102, marker 104, and/or speed sensor 106, noise may appear in the analog signal, as described in more detail below. In some embodiments, multiple markers 104 are located around shaft 102, for example if a gear is used to sense speed or to allow for better resolution for speed measurement.

In the exemplary embodiment, an integrated circuit 110 is coupled to speed sensor 106. More specifically, speed sensor 106 and integrated circuit 110 may be housed within a single housing, physically mounted to the same printed circuit board, coupled by one or more wires or conductors, and/or in wireless communication with each other. The coupling between speed sensor 106 and integrated circuit 110 is represented by line 108. Line 108 may transmit data and power between integrated circuit 110 and speed sensor 106. Integrated circuit 110 includes analog circuitry 112 and digital components 114 that include a processor 116 and a memory 118 coupled to processor 116. Depending on the particular embodiment, processor 116 is a microprocessor, a microcontroller, a field-programmable gate array (FPGA), an application-specific integrated circuit (ASIC), or other digital processing device or circuitry. Memory 118 may include, but is not limited to, any computer-operated hardware suitable for storing and/or retrieving processor-executable instructions and/or data. Memory 118 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). In some embodiments, integrated circuit 110 does not contain a microprocessor and includes no memory, other than registers. Additionally, in some embodiments, integrated circuit 110 is controlled by an external microprocessor through a digital communication interface, for example an SPI (serial peripheral interface). Additionally, in some embodiments, an external microprocessor interfaces with integrated circuit 110 through digital latches within integrated circuit 110. In some embodiments, a threshold voltage is latched into integrated circuit 110 and values from an analog-to-digital converter (ADC) and error detection circuitry is made available on output latches.

Integrated circuit 110 is coupled to a computing device 122 via a bus 120 that enables transmission of data between integrated circuit 110 and computing device 122. In some embodiments, bus 120 is a physical connection, for example one or more conductors. In such embodiments, bus 120 may also enable transmission of power to integrated circuit 110. In other embodiments, bus 120 is a wireless connection. It should be understood that in embodiments where line 108 and/or bus 120 are wireless rather than physical connections, speed sensor 106, integrated circuit 110, and computing device 122 each include corresponding wireless transceivers to enable such communication.

As referenced above, computing device 122 is coupled to integrated circuit 110. Computing device 122 receives a digital signal 502 (FIG. 5) generated by integrated circuit 110, as described in more detail below. Computing device 122 may store and analyze data pertaining to the rotation of shaft 102.

Figure 2:
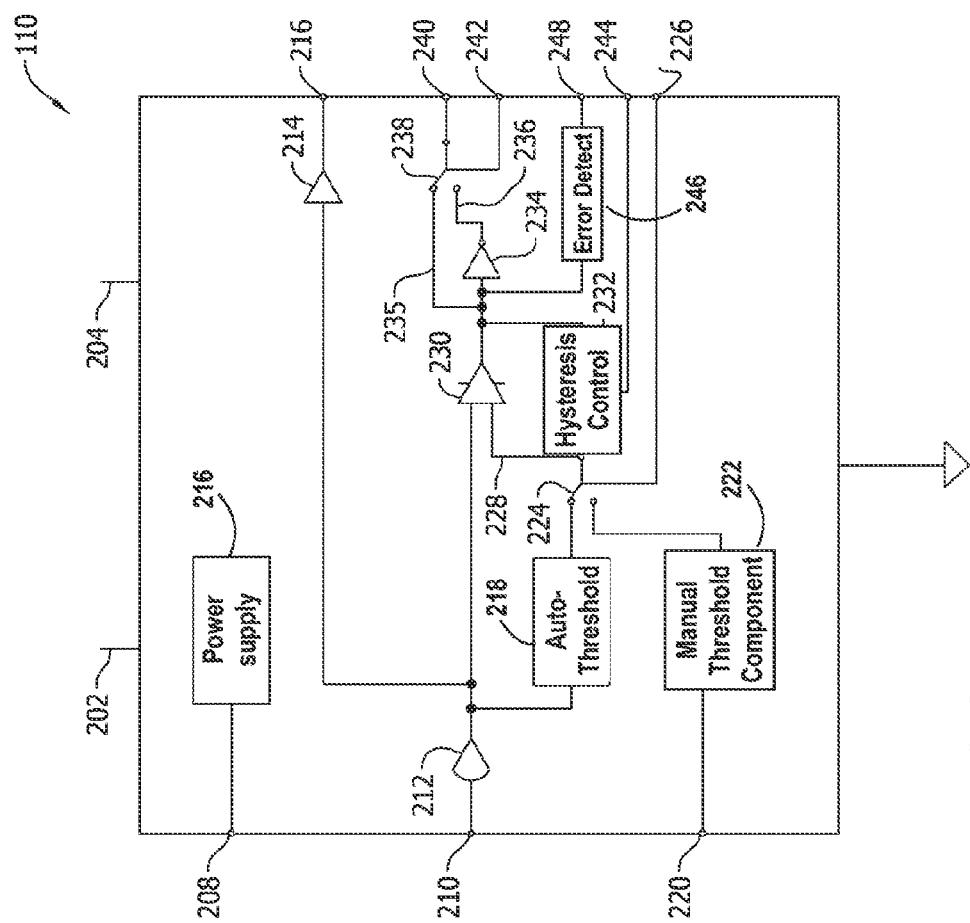
FIG. 2 is a functional block diagram of an exemplary integrated circuit that may be used for conditioning a signal from a speed sensor, such as the speed sensor shown in FIG. 1.

FIG. 2 is a functional block diagram of integrated circuit 110. Integrated circuit 110 may be used for conditioning analog signal 402 (FIG. 4) from speed sensor 106 (FIG. 1). As will be appreciated by those skilled in the art, digital components discussed with reference to FIG. 2 may be considered to be components of processor 116 and/or memory 118 (FIG. 1), and analog components discussed with reference to FIG. 2 may be considered to be analog circuitry 112 (FIG. 1). In the exemplary embodiment, integrated circuit 110 includes analog power input line 202 and digital power input line 204. Analog power input line 202 receives power from an external source (not shown) to provide sufficient power to any analog circuitry 112 (FIG. 1) that requires external power to function properly. For example, analog power input line 202 provides power to power supply 206. Power supply 206 conditions and makes power available for speed sensor 106 (FIG. 1) through power output line 208. In some embodiments, power output line 208 is current-limited to avoid damage to integrated circuit 110 with a field wiring short. Additionally, in some embodiments, integrated circuit 110 may perform error detection of power output line 208 to determine if a fault has occurred and output a signal on line 248, or another line, to indicate that the fault occurred. In other embodiments, speed sensor power supply 206 and power output line 208 are not included in integrated circuit 110.

Figure 4:
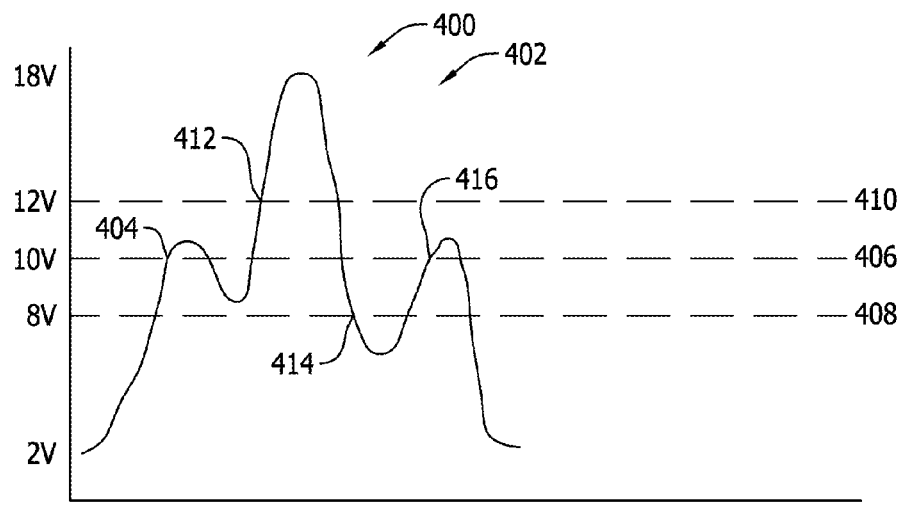
FIG. 4 is an exemplary plot of an analog signal generated by the speed sensor shown in FIG. 1.

Digital power input line 204 provides power to digital components 114 (FIG. 1) as needed. Line 210 receives analog signal 402 (FIG. 4) from speed sensor 106 (FIG. 1). A buffer 212 is coupled to line 210, to buffer analog signals 402 (FIG. 4) received from speed sensor 106 (FIG. 1). Downstream from buffer 212, is a second buffer 214 that creates a short-circuit-protected version of analog signal 402 (FIG. 4) to be output on line 216. Also downstream from buffer 212 is an auto-threshold component 218 that may be implemented using analog circuitry 112 (FIG. 1) and/or digital components 114 (FIG. 1). Auto-threshold component 218 receives analog signals 402 (FIG. 4) and determines a variance (i.e., a range based on a positive excursion and a negative excursion) in each analog signal 402. Based on the variance, auto-threshold component 218 determines a threshold, that if exceeded by analog signal 402, conclusively indicates that marker 104 (FIG. 1) is in the predetermined proximity of speed sensor 106 and below which is indicative that marker 104 (FIG. 1) is not within the predetermined proximity of speed sensor 106. For example, the threshold may be 10v, as shown in FIG. 4.

Line 220 receives an analog voltage signal that is transmitted to manual threshold component 222. Switch 224 determines whether the output of auto-threshold component 218 or manual threshold component 222 is transmitted along line 228 to edge detector 230. In other embodiments, line 220 receives a digital signal representing a voltage value and the digital signal is converted to an analog voltage signal by a digital-to-analog converter (DAC) coupled to line 220. Switch 224 is controlled by threshold type control line 226. For example, switch 224 may be biased towards the output of auto-threshold component 218 and switches to instead receive output from manual threshold component 222 if a predetermined voltage, such as 5v, for example, is applied to threshold type control line 226. In other embodiments, integrated circuit 110 includes a register that includes a bit that controls the state of switch 224.

Edge detector 230 compares analog signal 402 (FIG. 4) received through line 210 against a threshold value input to edge detector 230 through line 228. When analog signal 402 is above the threshold value (e.g., 10v) provided at line 228, edge detector 230 outputs a digital one (e.g. 5v). When analog signal 402 is below the threshold value (e.g., 10v) provided at line 228, edge detector 230 outputs a digital zero (e.g. 0v). Given that noise exists in analog signal 402 due to vibration or other effects induced to shaft 102 and/or speed sensor 106, analog signal 402 may momentarily dip below the threshold after rising above it. In such situations, hysteresis control 232 prevents edge detector 230 from incorrectly outputting a digital zero, indicating that marker 104 is no longer within the predetermined proximity of speed sensor 106.

Hysteresis control 232 receives the output value (e.g., digital one or digital zero) from edge detector 230 and sets a corresponding hysteresis threshold 408 or 410 (both shown in FIG. 4) depending on the most recent output value from edge detector 230. For example, if edge detector 230 most recently output a digital one, hysteresis control 232 adjusts the output of auto-threshold component 218 or manual threshold component 222 to lower hysteresis threshold 408, which is, for example, 8v. That is, the output of hysteresis control 232 adjusts the output value of auto-threshold component 218 and manual threshold component 222 by adding or subtracting to the output value by an amount input at hysteresis selector line 244, for example, plus or minus 2v. Accordingly, if edge detector 230 most recently output a digital one, analog signal 402 must fall below 8v for edge detector 230 to output a digital zero. Conversely, if edge detector 230 most recently output a digital zero, hysteresis control 232 adjusts the output of auto-threshold component 218 or manual threshold component 222 to upper hysteresis threshold 410, which is 12v, in the exemplary embodiment. Accordingly, analog signal 402 must rise above 12v for edge detector 230 to output a digital one. In some embodiments, hysteresis control 232 may be programmed with an amount of adjustment to be applied to the output of auto-threshold component 218. Additionally, in some embodiments, hysteresis control 232 adjusts the output of auto-threshold component 218 by a different amount, or not at all, depending on whether edge detector 230 most recently output a digital zero or a digital one.

The output of edge detector 230 ultimately is output at line 240. Switch 238, which is controlled by polarity selector line 242 determines whether the output received at line 240 is an unmodified output of edge detector 230, as would be received from line 235, or is inverted by inverter 234 and received from line 236.

Coupled downstream of edge detector 230 is an error detection component 246. Error detection component 246 determines whether the output of edge detector 230 indicates at rotational speed above a predetermined speed, for example 100,000 rotations per minute. That is, the predetermined speed is a rotational speed that shaft 102 would not reach in the absence of a malfunction. For example, if edge detector 230 outputs a digital one at least 100,000 times per minute, error detection component 246 generates an error code, which may be a number, a set of characters, or other data, and stores the error code in memory 118 (FIG. 1). Error detection component 246 may cause a digital one, a digital zero, and/or the error code itself to be output at error output line 248. In some embodiments, the predetermined speed may be programmatically changed, for example by computing device 122 through bus 120. In some embodiments, error detection component 246 additionally or alternatively detects a period error. More specifically, in some embodiments, error detection component 246 determines whether a difference between a first period and a subsequent period exceeds a predetermined amount, indicating that an error occurred. In some embodiments, integrated circuit 110 performs error detection on the signal transmitted between buffer 212 and edge detector 230 to detect if the signal is outside a range of a properly functioning transducer signal. In some embodiments, the results of various error-checking processes carried out by integrated circuit 110 are output on error output line 248 and/or additional error output lines. Additionally, in some embodiments, integrated circuit 110 performs a voltage range error check of analog voltages received or transmitted by integrated circuit 110, using an analog comparator or a digital value from an analog-to-digital converter (ADC). In some embodiments wherein multiple types of errors may be detected and only a single error output line is used, for example error output line 248, an error code specifying the type of error is stored in memory 118 (FIG. 1), which may include, for example, a register.

It should be understood that, in some embodiments, one or more of lines 216, 220, 226, 240, 244, and 248 are included within bus 120 (FIG. 1). Likewise, it should be understood that lines 208 and/or 210 correspond to line 108 (FIG. 1).

Figure 3:
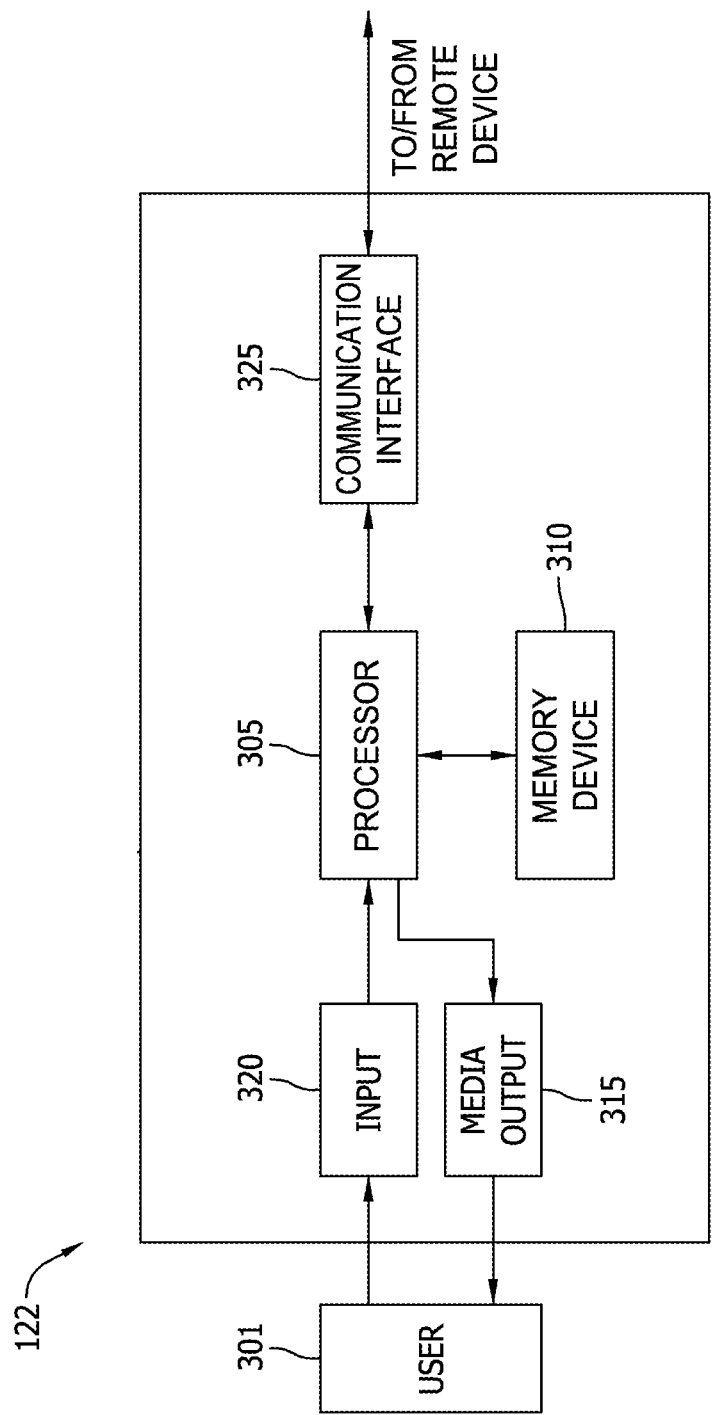
FIG. 3 illustrates an exemplary computing device that may be used with the system shown in FIG. 1.

FIG. 3 illustrates components of computing device 122 of FIG. 1. Computing device 122 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or other data to be stored and retrieved. Memory area 310 may include one or more computer readable media.

Computing device 122 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couple-able to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 315.

In some embodiments, computing device 122 includes an input device 320 for receiving input from user 301. Input device 320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 315 and input device 320.

Computing device 122 may also include a communication interface 325, which is communicatively couple-able to another device, such as integrated circuit 110 or another computing device. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, processor-executable instructions for providing a user interface to user 301 via media output component 315 and, optionally, receiving and processing input from input device 320. A user interface may, for example, display information pertaining to the rotation of shaft 102 and/or other rotating devices, and may, for example, include controls for allowing user 301 to select particular sets or types of information to display. A user interface may also allow user 301 to view one or more error codes or other status messages generated by integrated circuit 110.

Memory area 310 may include, but is not limited to, any computer-operated hardware suitable for storing and/or retrieving processor-executable instructions and/or data. Memory area 310 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 310 may include multiple storage units such as hard disks or solid state disks in a redundant array of inexpensive disks (RAID) configuration. Memory area 310 may include a storage area network (SAN) and/or a network attached storage (NAS) system. In some embodiments, memory area 310 includes memory that is integrated in computing device 122. For example, computing device 122 may include one or more hard disk drives as memory 310. Memory area 310 may also include memory that is external to computing device 122 and may be accessed by a plurality of computing devices 122. The above memory types are exemplary only, and are thus not limiting as to the types of memory usable for storage of a processor-executable instructions and/or data.

FIG. 4 is an exemplary plot 400 of analog signal 402 generated by speed sensor 106 (FIG. 1). At section 404, analog signal 402 has exceeded threshold 406 (10v). However, given that edge detector 230 has most recently output a digital zero, hysteresis control 232 has adjusted the threshold value provided to edge detector 230 to upper hysteresis threshold 410 (12v). At section 404, analog signal 402 has not exceeded upper hysteresis threshold 410. Accordingly, integrated circuit 110, and more specifically, edge detector 230 (FIG. 2) continues to output a digital zero. At section 412, analog signal 402 exceeds hysteresis threshold 410. Accordingly, integrated circuit 110, and more specifically, edge detector 230, outputs a digital one. Given that edge detector 230 most recently output a digital one, hysteresis control 232 adjusts the threshold value provided to edge detector 230 to lower hysteresis threshold 408 (8v). Accordingly, analog signal 402 must drop below lower hysteresis threshold 408 (8v) for integrated circuit 110, and more specifically, edge detector 230, to output a digital zero.

At section 414, analog signal 402 falls below lower hysteresis threshold 408 (8v). Accordingly, integrated circuit 110, and more specifically, edge detector 230 outputs a digital zero. Due to noise in analog signal 402, at section 416, analog signal 402 momentarily rises above threshold 406 (10v). However, given that edge detector 230 most recently output a digital zero, hysteresis control 232 adjusted the threshold value provided to edge detector 230 to upper hysteresis threshold 410 (12v). Given that section 416 of analog signal 402 has not exceeded upper hysteresis threshold 410, edge detector 230 continues to output a digital zero.

Figure 5:
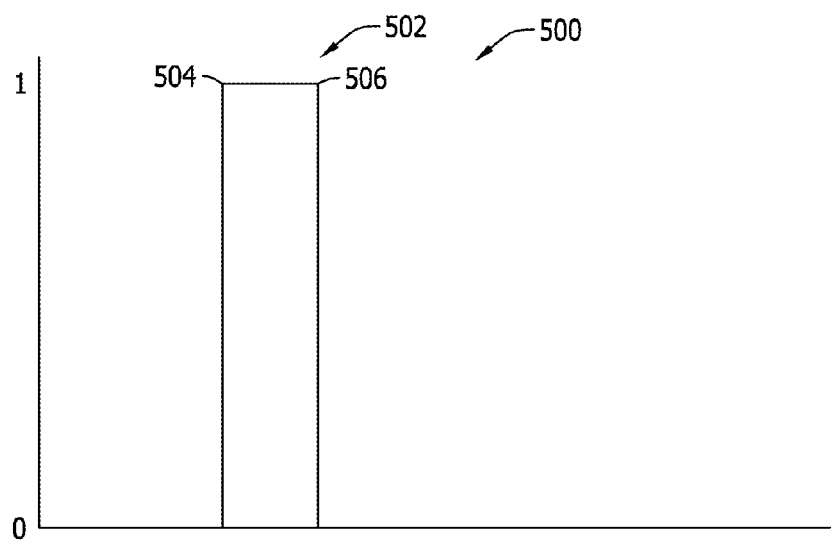
FIG. 5 is an exemplary plot of a digital signal generated by the integrated circuit shown in FIGS. 1 and 2.

FIG. 5 is an exemplary plot 500 of a digital signal 502 generated by integrated circuit 110 (FIG. 1). At section 504, which corresponds to section 412 of analog signal 402 (FIG. 4), integrated circuit 110 switches from outputting digital zero to outputting digital one. At section 506, which corresponds to section 414 of analog signal 402 (FIG. 4), integrated circuit switches from outputting digital one to outputting digital zero. Digital signal 502 is output from edge detector 230, through line 235, to line 240. If switch 238 is in an opposite state, such that the output of inverter 234 passes through line 236 and through line 240, then digital signal 502 would be inverted, such that any zeros are ones and vice versa.

Figure 6:
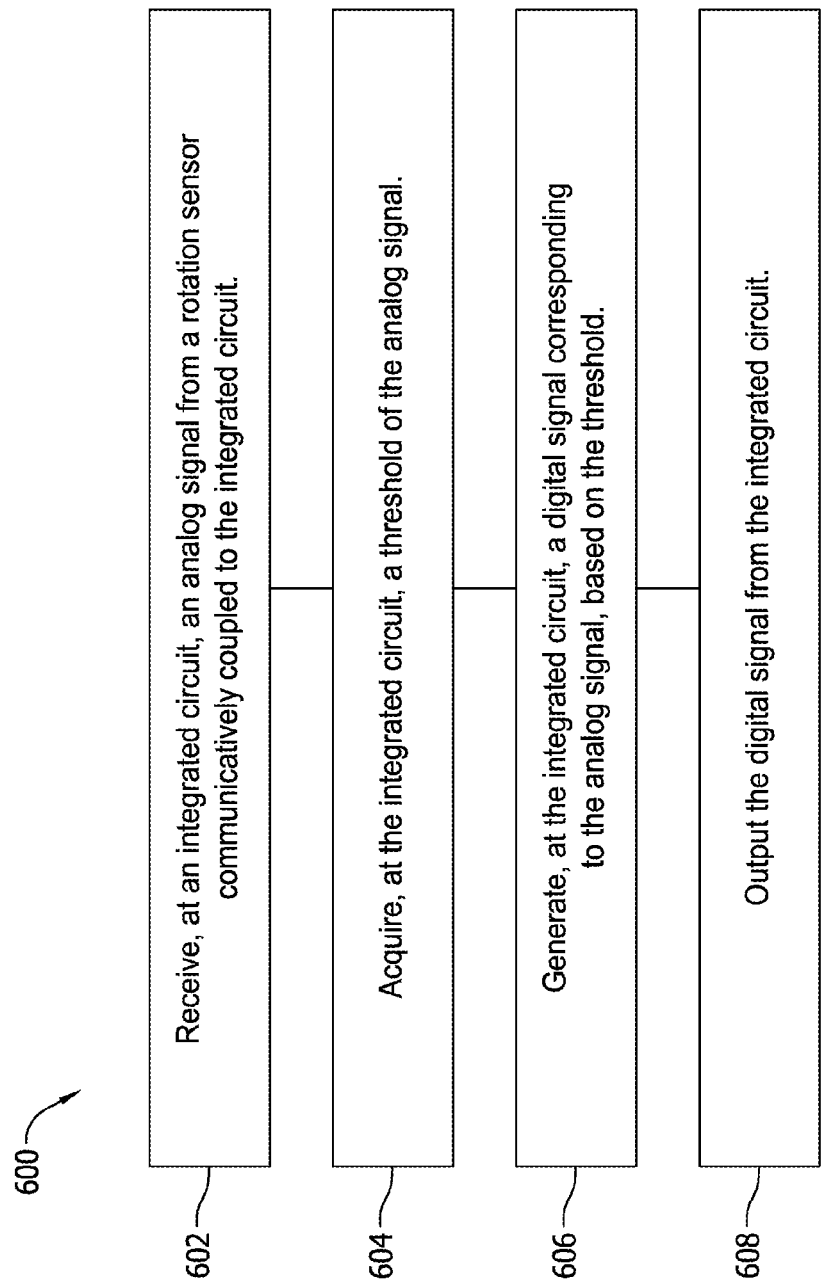
FIG. 6 is a flowchart of an exemplary method that may be implemented to condition the analog signal of FIG. 4 and generate the corresponding digital signal of FIG. 5.

FIG. 6 is a flowchart of an exemplary method 600 that may be implemented to condition analog signal 402 of FIG. 4 and generate corresponding digital signal 502 of FIG. 5. At step 602, integrated circuit 110 (FIG. 1) receives analog signal 402 from speed sensor 106. Speed sensor 106 is communicatively coupled to integrated circuit 110 (FIG. 1). At step 604, integrated circuit 110 (FIG. 1) acquires a threshold for analog signal 402. That is, a threshold value is input into manual threshold component 222 or is determined by auto-threshold component 218, as described above. At step 606, integrated circuit 110 generates a digital signal corresponding to the analog signal, based on the acquired threshold. As described above, integrated circuit 110 may adjust the threshold using hysteresis control 232 such that analog signal must rise above a first hysteresis threshold, for example upper hysteresis threshold 410, in order for integrated circuit 110 to generate a digital one, or drop below a second hysteresis threshold, for example lower hysteresis threshold 408, for integrated circuit 110 to generate a digital zero, or vice versa. At step 608, integrated circuit 110 outputs the generated digital signal 502, for example, to computing device 122. As explained above, integrated circuit 110 may invert the digital signal 502 using inverter 234, for example, prior to outputting digital signal 502. In other embodiments, additional steps may be performed, such as providing power to speed sensor 106 and determining that speed sensor 106 and/or other components and wiring are operating normally.

A technical effect of systems and methods described herein includes at least one of: (a) receiving, at a circuit, an analog signal from a speed sensor coupled to the circuit; (b) acquiring, at the circuit, a threshold of the analog signal; (c) generating, at the circuit, a digital signal corresponding to the analog signal, based on the threshold; and (d) outputting the digital signal from the circuit.

As compared to known systems and methods for conditioning a signal from a speed sensor, the systems and methods described herein require a smaller footprint, occupy less space, require less design time, and are simpler to manufacture. Accordingly, people making use of the systems and methods described herein may benefit from the above-described signal conditioning functionality without spending as much time determining how the necessary components will fit within a given space or how to incorporate the components into a larger product or system.

Exemplary embodiments of systems and methods for conditioning a signal from a speed sensor are described above in detail. The methods and systems described herein are not limited to the specific embodiments described herein, but rather, components of the systems and/or steps of the methods may be utilized independently and separately from other components and/or steps described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. Circuitry configured to condition a signal from a speed sensor, the circuitry configured to:
   receive an analog signal from a speed sensor coupled to the circuit;
   acquire a threshold of the analog signal;
   generate an upper threshold by adding a hysteresis value to the threshold;
   generate a lower threshold by subtracting the hysteresis value from the threshold;
   apply hysteresis to the analog signal using the upper threshold and the lower threshold;
   generate a digital signal corresponding to the analog signal, based on the upper and lower thresholds; and
   output the digital signal.

2. The circuitry of claim 1, wherein the circuitry is configured to acquire the threshold of the analog signal by receiving an input threshold value.

3. The circuitry of claim 1, wherein the circuitry is configured to acquire the threshold of the analog signal by determining a variance in the analog signal.

4. The circuitry of claim 1, wherein the circuitry is configured to invert the digital signal.

5. The circuitry of claim 1, wherein the circuitry is configured to receive the hysteresis value.

6. The circuitry of claim 1, wherein the circuitry is configured to:
   determine an apparent rotational speed of a device based on the analog signal or the digital signal; and
   generate an error if the apparent rotational speed is above a speed threshold.

7. The circuitry of claim 1, wherein the circuitry comprises a memory and is configured to:
   determine whether an error exists in the analog signal or the digital signal; and
   generate an error code, after determining that an error exists in the analog signal or the digital signal; and
   store the error code in the memory.

8. A system for use in conditioning a signal from a speed sensor, comprising:
   a device rotatably mounted in a machine;
   a speed sensor mounted proximal to the device;
   circuitry coupled to the speed sensor; and
   a computing device coupled to the circuitry,
   wherein the circuitry is configured to:
      receive an analog signal from the speed sensor;
      acquire a threshold of the analog signal;
      generate an upper threshold by adding a hysteresis value to the threshold;
      generate a lower threshold by subtracting the hysteresis value from the threshold;
      apply hysteresis to the analog signal using the upper threshold and the lower threshold;
      generate a digital signal corresponding to the analog signal, based on the upper and the lower threshold; and
      output the digital signal to the computing device.

9. The system of claim 8, wherein the circuitry is configured to acquire the threshold of the analog signal by receiving, from the computing device, an input threshold value.

10. The system of claim 8, wherein the circuitry is configured to acquire the threshold of the analog signal by determining a variance in the analog signal.

11. The system of claim 8, wherein the circuitry is configured to invert the digital signal.

12. The system of claim 8, wherein the circuitry is configured to receive the hysteresis value from the computing device.

13. The system of claim 8, wherein the circuitry is configured to:
   determine an apparent rotational speed of the device based on the analog signal or the digital signal; and
   generate an error if the apparent rotational speed is above a speed threshold.

14. The system of claim 8, wherein the circuitry includes a memory and is configured to perform the steps of:
   determine whether an error exists in the analog signal or the digital signal; and
   generate an error code, after determining that an error exists in the analog signal or the digital signal; and
   store the error code in the memory.

15. A method for use in conditioning a signal from a speed sensor, the method comprising:
   receiving, at circuitry, an analog signal from a speed sensor coupled to the circuitry;
   acquiring, at the circuitry, a threshold of the analog signal;
   generating an upper threshold by adding a hysteresis value to the threshold;
   generating a lower threshold by subtracting the hysteresis value from the threshold;
   applying hysteresis to the analog signal using the upper threshold and the lower threshold;
   generating, at the circuitry, a digital signal corresponding to the analog signal, based on the upper threshold and the lower threshold; and
   outputting the digital signal from the circuit.

16. The method of claim 15, wherein acquiring the threshold of the analog signal includes receiving, at the circuitry, an input threshold value.

17. The method of claim 15, wherein acquiring the threshold includes determining, at the circuitry, a variance in the analog signal.

18. The method of claim 15, comprising inverting the digital signal.

19. The method of claim 15, comprising receiving the hysteresis value.

20. The method of claim 15, comprising determining, at the circuitry, an apparent rotational speed of a device based on the analog signal or the digital signal and generating an error if the apparent rotational speed is above a speed threshold.

* * * * *